US008351921B2

(12) United States Patent
Bell et al.

(10) Patent No.: US 8,351,921 B2
(45) Date of Patent: *Jan. 8, 2013

(54) PUSH NOTIFICATION SERVICE

(75) Inventors: Kris M. Bell, Los Altos, CA (US);
Darryl N. Bleau, Campbell, CA (US);
Jeffrey T. Davey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,854

(22) Filed: Oct. 25, 2011

(65) Prior Publication Data

US 2012/0040699 A1  Feb. 16, 2012

Related U.S. Application Data

(63) Continuation of application No. 12/479,606, filed on Jun. 5, 2009, now Pat. No. 8,064,896.

(60) Provisional application No. 61/158,693, filed on Mar. 9, 2009.

(51) Int. Cl.
*H04W 4/00* (2009.01)
(52) U.S. Cl. ............... 455/422.1; 455/435.1; 455/435.2; 455/421; 455/436; 370/312; 370/313; 370/349; 370/389; 370/432
(58) Field of Classification Search ............... 455/422.1, 455/435.1–435.2, 421, 436; 370/312–313, 370/349, 389, 432
See application file for complete search history.

(56) References Cited

U.S. PATENT DOCUMENTS

| 5,410,543 A | 4/1995 | Seitz |
| 2003/0095540 A1 | 5/2003 | Mulligan |
| 2004/0047345 A1 | 3/2004 | Joseph et al. |
| 2007/0214245 A1 | 9/2007 | Hamalainen |

FOREIGN PATENT DOCUMENTS

WO  WO 97/20441  6/1997

OTHER PUBLICATIONS

PCT International Preliminary Report on Patentability mailed Sep. 22, 2011 for PCT/US2010/026446 filed Mar. 5, 2010, 8 pages.
PCT International Search Report for PCT/US2010/026446 dated Jun. 4, 2010, 7 pages.
PCT Written Opinion of the International Searching Authority for PCT/US2010/026446 dated Jun. 4, 2010, 8 pages.
Pospischil, Gunther, et al., "A Location-based Push Architecture Using SIP", XP-002235856, International Symposium Wireless Personal Multimedia Communications, Sep. 9, 2001, pp. 295-300.
Tosi, Davide, "An Advanced Architecture of Push Services", Web Information Systems Engineering Workshops, 2003, Proceedings of the Fourth International Conference on Web Information Systems Engineering Workshops (WISEW'03), Rome, Italy, on Dec. 13, 2003, IEEE LNKD-DOI:10.1109/WISEW.2003. 1286802, XP010697505, Jan. 1, 2003, pp. 193-200.

*Primary Examiner* — Wayne Cai
(74) *Attorney, Agent, or Firm* — Blakely, Sokoloff, Taylor & Zafman LLP

(57) ABSTRACT

Gateway devices maintain presence information for various mobile devices. Each gateway is associated with a zone and manages presence information only for mobile devices associated with that zone. Courier devices back-propagate presence information for the mobile devices to respective gateways based at least on the respective zone associated with each mobile device. The gateways and couriers are dynamically configured such that messages can be pushed from a provider application to a mobile device via any gateway and any courier.

24 Claims, 5 Drawing Sheets

PUSH NOTIFICATION SERVICE

CROSS REFERENCE TO RELATED APPLICATIONS

This application is a continuation of co-pending U.S. application Ser. No. 12/479,606 filed on Jun. 5, 2009, now U.S. Pat. No. 8,064,896 which claims priority to U.S. Provisional Patent Application No. 61/158,693, entitled Push Notification Service, filed on Mar. 9, 2009.

FIELD

Embodiments of the invention relate to the field of mobile device processing; and more specifically, to the management of notification messages.

BACKGROUND

Users of the mobile devices (laptops, palmtops, mobile phones, smart phones, multimedia phones, portable media players, GPS units, mobile gaming systems, etc.) may have applications installed that periodically receive notification messages from notification services. For example, such applications include "push" e-mail services (e.g., MobileMe, Microsoft Exchange, ActiveSync, Push-IMAP, Yahoo! Push, etc.), or other push services (e.g., update/upgrade services, news services, web blog services, podcast services, social networking services, or other types of services where notification messages may be sent). Notification messages typically represent events of interest, which are typically defined by the applications (e.g., new e-mail indicator, new news item indicator, new podcast indicator, change of on-line status of a social networking friend, etc.).

The increase in the use of mobile devices magnifies the complexity of routing notification messages to those devices. One problem is that mobile devices are not inherently addressable; for example, there is currently no mobile version of IPv6. In other words, mobile devices do not have their own IP addresses in the same way that a desktop computer, or even a laptop computer, has an IP address. Furthermore, mobile devices are sometimes logically behind a service provider firewall that likely employs network address translation (NAT). Such firewalls are applicable both within the cellular context and the wi-fi context. Given that mobile devices are not inherently addressable, it is difficult to route messages to a mobile device, particularly on a large scale.

Scalability becomes a particular issue within the context of notification messages sent to mobile devices as the number of mobile devices connected to a network increases. For example, a network device that connects to mobile devices can typically manage device connections for thousands of mobile devices at a time. Thus, to accommodate hundreds of millions of mobile devices would require hundreds of thousands of network server devices to manage the connections and the routing of messages to those hundreds of millions of devices. Of course, hundreds of thousands of network server devices would be both cost prohibitive and very complex to implement. Additionally, static routing of messages using network server devices are often not failsafe or fault tolerant, meaning that if a network device goes down, it is possible that notification messages will not be able to reach certain mobile devices.

SUMMARY OF THE DESCRIPTION

A system for routing notification messages is described herein. According to various embodiments, this system includes a plurality of gateways, or gateway devices. Each gateway device is associated with a zone, and each gateway maintains presence information for mobile devices associated with that zone. This system also includes a plurality of courier devices, which back-propagate presence information for the mobile devices to respective gateways based at least on a zone associated with each mobile device. The gateways and couriers are dynamically configured such that notification messages can be pushed from a provider application to a mobile device via any gateway and any courier. In other words, the provider can connect to any of the gateways and the device can connect to any of the couriers and the system can appropriately forward the message from the provider to the mobile device on a path through at least one gateway and a courier.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Systems, methods, and apparatuses for forwarding notification messages from a provider application to a mobile device are described herein. By employing a dynamic partitioning scheme, various embodiments described herein can accommodate forwarding notification messages to hundreds of millions of mobile devices.

Figure 1:
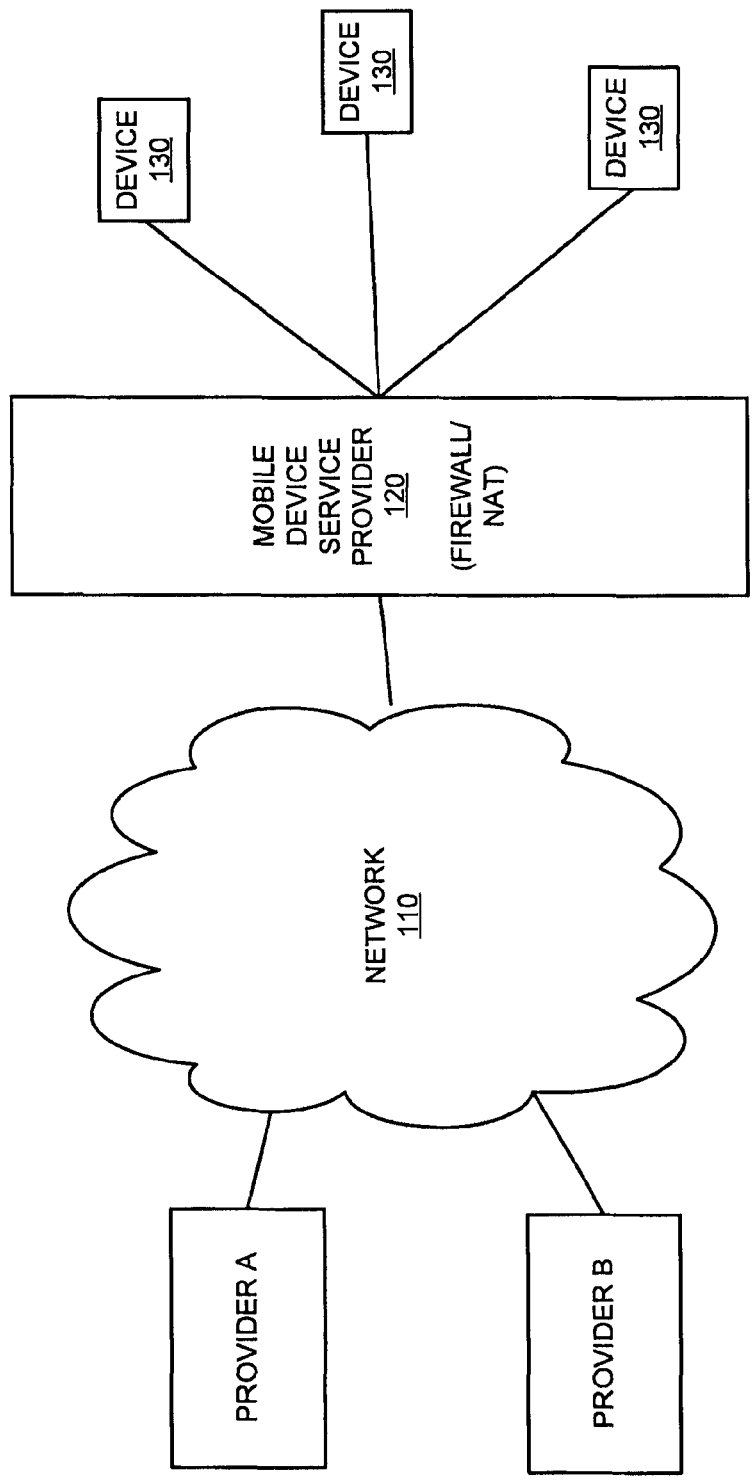
FIG. 1 is a block diagram illustrating a system according to the prior art.
Figure 2:
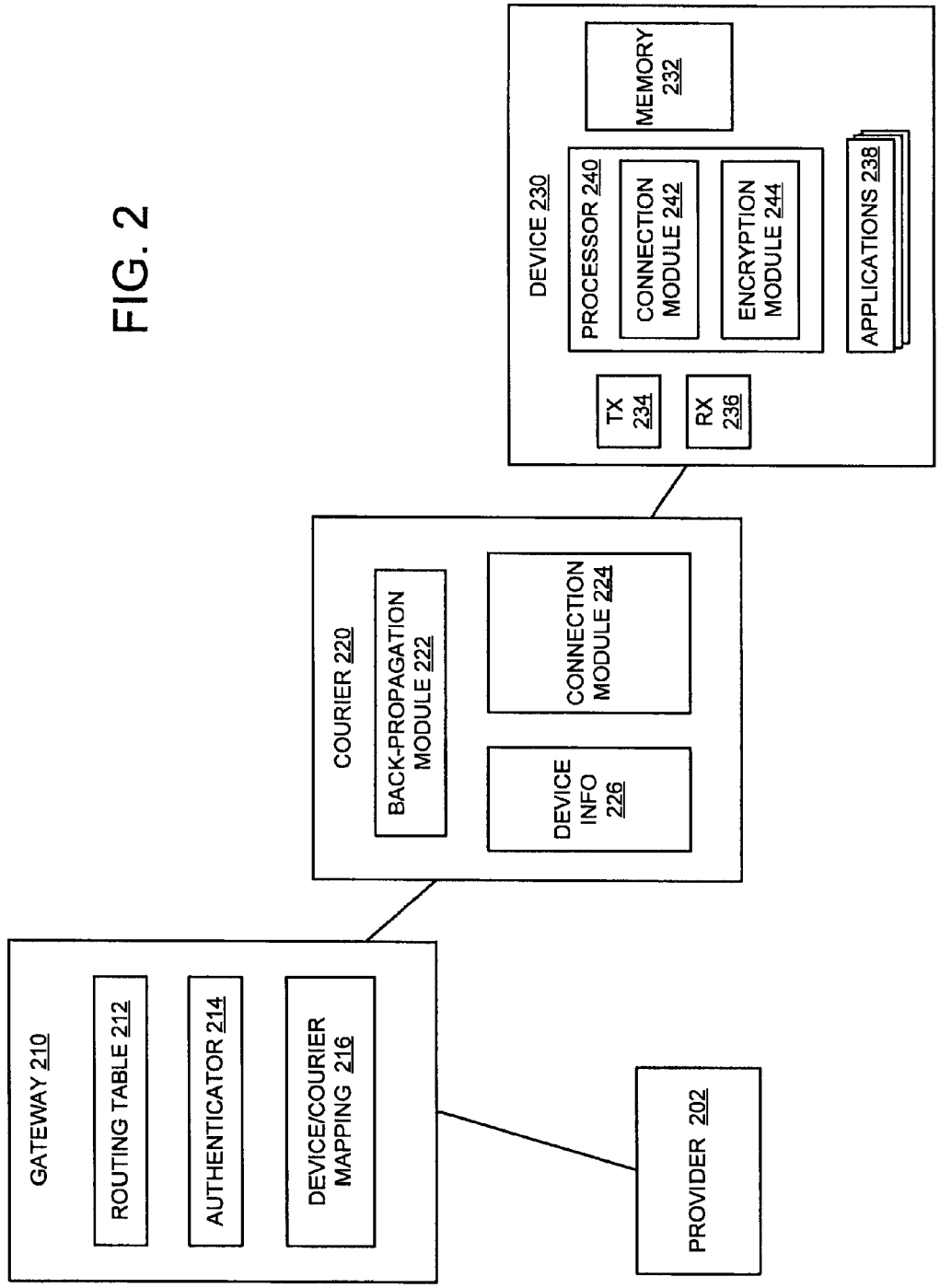
FIG. 2 is a block diagram illustrating a system according to various embodiments.

FIG. 2 is a block diagram according to various embodiments. Forwarding a notification message from a provider 202 to a mobile device 230 requires at least one gateway 210 and one courier 220. Gateway 210 receives notification messages (e.g., push messages) from provider 202. In various embodiments, provider 202 sends an authentication Secure Sockets Layer (SSL) certificate upon an initial connection with gateway 210. This SSL certificate can be configured with additional user-defined data. Other secure communications protocols (e.g., cryptographic protocols such as Transport Layer Security (TLS), etc.) can be used in other embodiments. Authenticator 214 uses any additional user-defined data to identify the provider 202 in a trusted fashion.

Where a provider associated with a particular application (e.g., Twitter) includes additional identifying (e.g., user-defined) data within the SSL certificate, gateway 210 can not only authenticate the provider, but also automatically provision push service for the provider and the application (e.g., Twitter). In other words, gateway 210 can automatically extract any additional identifying data from the authentication certificate and attach the additional identifying data (or a portion of the data) to messages (e.g., push-notification messages). In some embodiments, the additional identifying data may identify a topic or feed associated with the provider (or an application of the provider) to which a user might subscribe. Thus, the additional information in the authentication certificate can be leveraged to direct messages to mobile devices that have subscribed to the topic/feed or requested information regarding the topic/feed. In this way, push service is automatically provisioned for the provider.

Having received a notification message from an authenticated provider 202, gateway 210 determines the destination zone for the notification message. The destination zone is included within a token that is sent along with the notification message. In some embodiments, it is not necessary to send the zone information as part of a token. By extracting the zone from the token or otherwise obtaining the zone information, gateway 210 determines whether the destination zone matches the zone maintained/managed by gateway 210. So, for example, if gateway 210 is responsible for zone 5, then all messages received from a provider having the destination zone 5 can be forwarded to a courier by gateway 210. However, if gateway 210, which is responsible for zone 5, receives a message whose destination zone is zone 8, then gateway 210 must route the notification message to the gateway that is responsible for zone 5.

Routing table 212 is used to route messages from one gateway to another gateway. In various embodiments, DNS (domain name service) is used to route messages between gateways. However, other routing protocols could be used in other embodiments. Thus, when a message is received at gateway 210, gateway 210 determines whether it is the appropriate gateway to forward the message. If not, gateway 210 performs a routing table lookup of routing table 212 to determine the appropriate gateway to forward the message. In some embodiments, the DNS lookup itself is used to determine whether the gateway is the appropriate gateway for forwarding the notification message.

In cases where gateway 210 receives a message having a particular destination zone that matches the zone managed by gateway 210, then gateway 210 can forward that message directly to the appropriate courier device using a device/courier mapping 216. Gateway 210 receives this mapping information from various couriers, which will be explained in more detail below. Zones are dynamically assigned to gateways. In other words, gateway 210 might manage notification messages for one zone for a period of time and then be switched, or reconfigured, to manage the forwarding of messages for a different zone at a later time.

Courier 220, similar to gateway 210, is a network device. Courier 220 includes a connection module 224, a back-propagation module 222, and maintains device information 226. Courier 220 can, in some embodiments, manage connections for upwards of 1.6 million devices. Couriers are not limited to connecting with devices of a particular zone. In other words, courier 220 can manage device connections where various connected devices belong to different zones.

When a device initially connects with courier 220, courier 220 provisions a zone for the device. In various embodiments, the zone provisioned for the device is permanent. Despite the particular zone assignment for each device, devices may lose their connection with courier 220 for various reasons. For example, a connection might be lost due to loss of cellular signal, or wi-fi signal, loss of power, or because the mobile device has changed geographic locations, etc. When a mobile device attempts to reconnect to the system and connect with a courier, the device can connect with any courier on the network. In this way, courier 220 can be connected to devices assigned to different zones.

As mentioned above, courier 220 maintains device information 226 for each device with which it is connected. Device information can include a zone identifier for the device, a unique device identifier (UID) for the device, and other device information. Connection module 224 is used to establish connections between courier 220 and various devices.

Courier 220 also includes a back-propagation module 222. Back-propagation module 222 is used to back-propagate the device information 226 to respective gateways. Device information is back-propagated to gateways based on zone information. For example, if courier 220 is connected to a zone 11 device, then courier 220 will provision a connection via connection module 224 with the gateway responsible for managing zone 11. Courier 220 will then back-propagate the device information for the zone 11 device to the gateway responsible for managing zone 11. In similar fashion, courier 220 will make connections with gateways of different zones to back-propagate specific device information for devices associated with those respective zones.

Mobile device 230 includes a processor 240, memory 232, a transmitter 234, a receiver 236, and one or more applications 238. Processor 240 includes a connection module 242 that determines a courier for connecting to the mobile device 230. Connection module 242 may use a round-robin DNS (Domain Name Service) scheme to determine a courier with which to connect. In other embodiments, a courier might be determined based on other information, such as geographical location, etc. Receiver 236 receives a zone identifier from the courier upon initially connecting with the courier. Encryption module 244 combines the zone identifier and the unique device identifier (UID) for the device to generate a device token. In various embodiments, encryption module 244 encrypts the token by applying a hashing algorithm (e.g., SHA-0, SHA-1, SHA-2, MD5, Whirlpool, or other hashing algorithms). Memory 232 stores the token. The token generated and encrypted by device 230 remains constant for mobile device 230 in various embodiments. In other words, the UID does not change and the zone identifier for the device does not change, either.

Once the token has been generated and encrypted, transmitter 234 transmits, or sends, the token to various provider applications (e.g., provider 202). The token may be transmitted when device 230 first calls provider 202. Provider 202 can use the token, or include the token, with any notification message so that it can be appropriately forwarded back to device 230.

Figure 3:
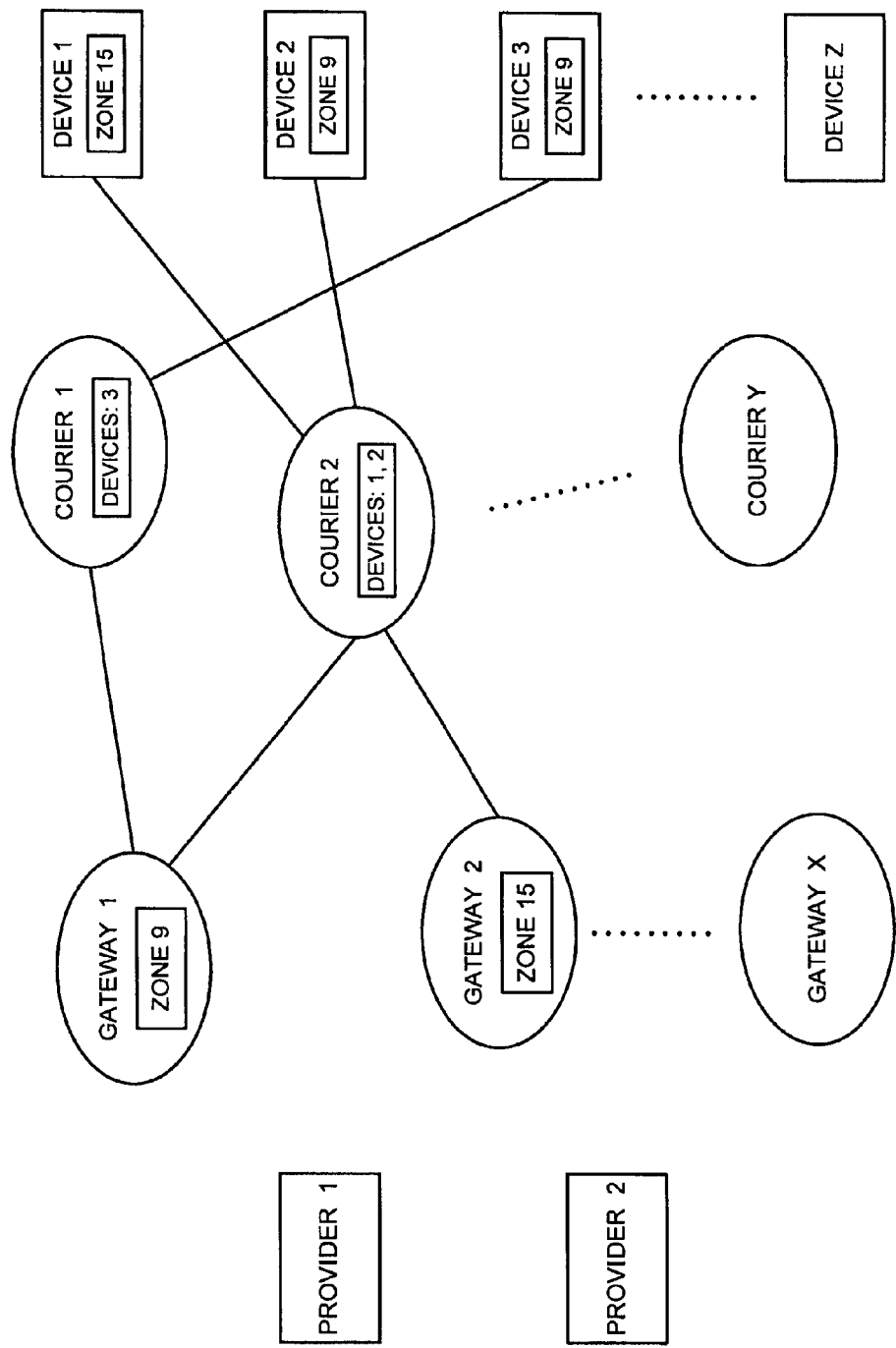
FIG. 3 is a block diagram, according to various embodiments.

FIG. 3 is a block diagram, according to various embodiments. In particular, FIG. 3 illustrates various examples of forwarding notification messages between providers and mobile devices. In one example, device 1 subscribes to a particular application managed by provider 1 and desires to receive notification messages for that application. Thus, device 1 calls provider 1 and transmits its device token to provider 1. As discussed above, that token includes an encrypted combination of the device's UID and its zone identifier. As shown in FIG. 3, device 1 has a zone identifier, zone 15. Thus, when provider 1 sends a notification message to device 1, it connects with one of the gateways in the system. In various embodiments, provider 1 connects to a gateway via round-robin DNS, although, in other embodiments, other connection schemes can be used. However, it is important to note that provider 1 does not need to connect to any particular gateway to successfully push a notification message to device 1. For example, if provider 1 usually connects with gateway 1 and sends a message intended for device 1, gateway 1 will look at the token accompanying the message and see that the message is intended for a device in zone 15. Given that gateway 1 is associated with zone 9, gateway 1 performs a routing table lookup (e.g., DNS lookup) and routes the message to gateway 2, which is responsible for zone 15.

Gateway 2 sends/forwards the message to courier 2 based on its device/courier mapping. Given that courier 2 is connected to device 1, courier 2 will have previously back-propagated the device information for device 1 to gateway 2 because device 1 belongs to zone 15 and gateway 2 is responsible for managing zone 15. Thus, gateway 2 is able to forward a message to courier 2, based on its device courier mapping; courier 2 is then able to lookup its connections and send the message to device 1.

Note in FIG. 3 that courier 2 is connected to both device 1 and device 2 and that each device belongs to a different zone. Thus, courier 2 back-propagates device information for each of the devices to the appropriate zone for the respective devices. In other words, courier 2 back-propagates device information for device 1 to gateway 2, given that gateway 2 manages zone 15. Courier 2 back-propagates device information for zone 2 to gateway 1, given that gateway 1 is responsible for managing zone 9. As mentioned above, back-propagation involves a courier establishing a connection with a gateway device and sending information as to its connections with various mobile devices (e.g., UIDs for the devices).

In another example, provider 2 wishes to send a notification message to device 3. Assume that provider 2 establishes a connection with gateway 1; thus, when provider 2 sends the message to gateway 1, gateway 1 determines that it is the appropriate gateway to forward the message, given that the message is intended for a zone 9 device (gateway 1 is responsible for zone 9). It can be seen from FIG. 3 that gateway 1 has connections with both courier 1 and courier 2, given that both courier 1 and courier 2 are each connected to a zone 9 device. However, based on the device/courier mappings back-propagated by courier 1 and courier 2, respectively, gateway 1 can perform a lookup of the mapping information and determine that the message should be forwarded to courier 1 in order to reach its destination at device 3. Once courier 1 receives the message, courier 1 forwards the message to device 3.

Figure 4:
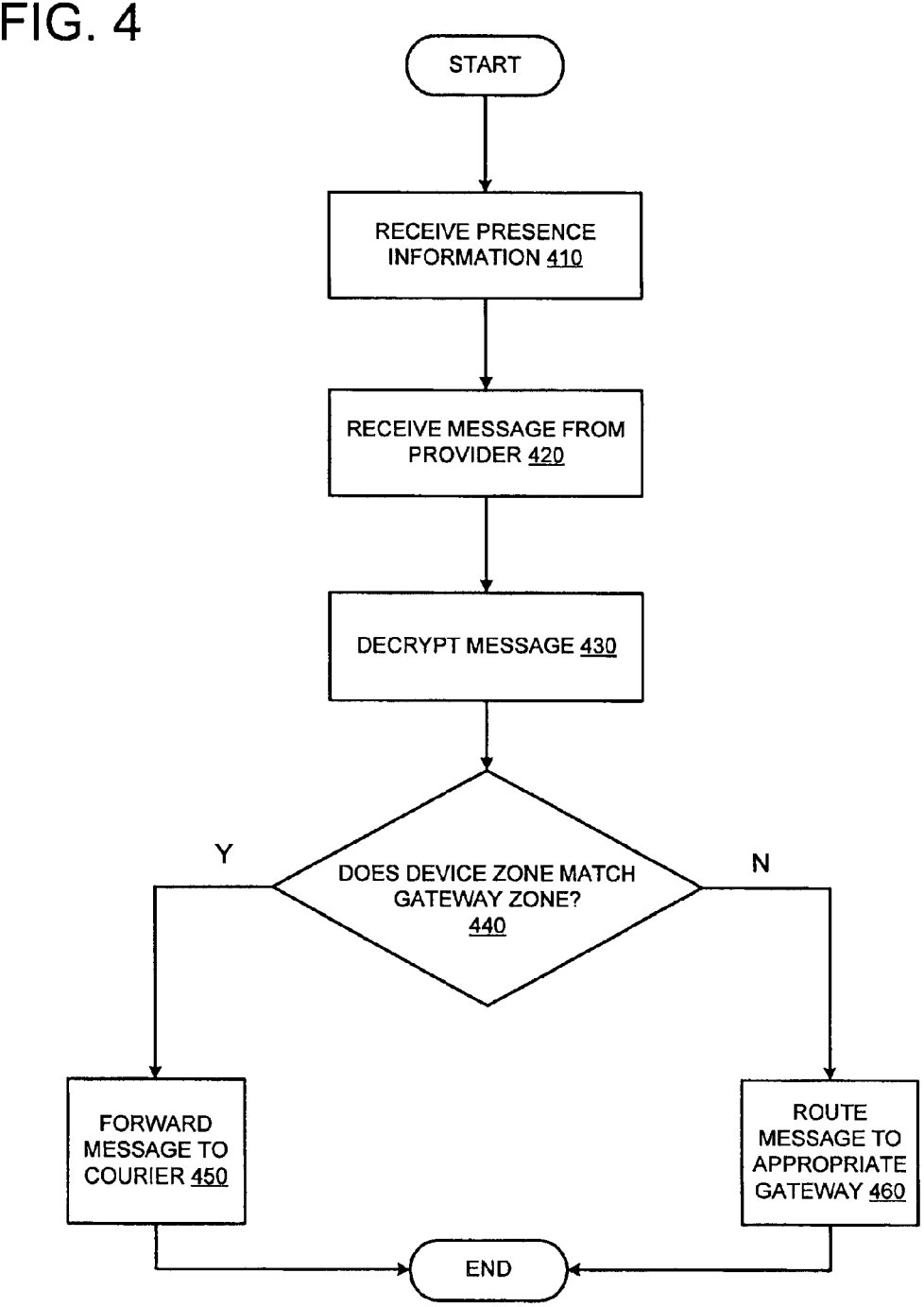
FIG. 4 is a flow diagram of operation, according to various embodiments.

FIG. 4 is a flow diagram of operation, according to various embodiments. Presence information for one or more mobile devices is dynamically received 410 from respective couriers connected to the mobile devices. The presence information for each mobile device includes a token comprised of a UID and a zone identifier. The term "dynamically receiving" as used herein refers to the concept that the presence information is not static. In other words, devices are not always connected to the same couriers and, therefore, gateways need to be dynamically updated to appropriately forward messages for devices to the correct couriers.

The notification message is received 420 at the first gateway device from a provider application. The notification message includes a mobile device token. The token is decrypted 430 (e.g., using a hashing algorithm) to determine the zone identifier associated with the message. It is then determined 440 whether the zone identifier in the message matches the zone currently managed by the gateway. If the zone identifier in the message does not match the zone managed by gateway, the gateway performs a routing table lookup and routes 460 the message to the appropriate gateway that manages the zone associated with the message. If the zone identifier in the message does match the zone managed by the gateway, the gateway refers to its device/courier mapping and forwards 450 the message to the appropriate courier.

Figure 5:
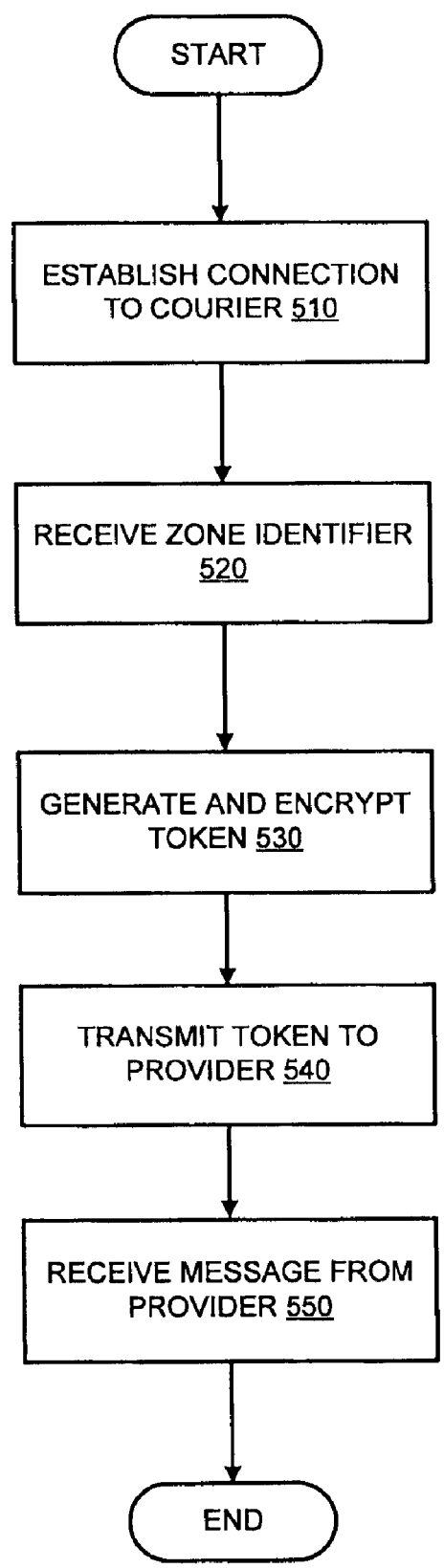
FIG. 5 is a flow diagram of operation, according to various embodiments.

FIG. 5 is a flow diagram of operation, according to various embodiments. A mobile device establishes 510 a connection to a courier device. The connection can be established by performing a round-robin DNS search, or other scheme, to establish a courier connection. A zone identifier is received 520 from the courier device upon connecting with the courier device. In various embodiments, the zone identifier is received only during an initial connection with the courier. In other words, a zone identifier is not received each time the device connects with a new courier. Instead, the zone identifier is received only the first time the device makes a connection of any kind with a courier.

A token for the device is generated and encrypted 530 via an encryption algorithm. The token includes both the device's unique identifier (UID) and the zone identifier. The encryption may be accomplished using a hashing algorithm, such as the hashing algorithms described previously. Once the token has been generated and encrypted, the token is transmitted 540 to a provider application. For example, the user of the mobile device might download, install, and/or subscribe to a particular application (e.g., Twitter). In some embodiments, when the mobile device next calls that provider application, it transmits the token to the provider 540. The transmittal of the token could also occur, for example, at the time the user subscribes and/or signs up for the application or service.

Subsequently, a message is received 550 from the provider application via a path that includes at least one gateway and a courier. In other words, the path might include one gateway, or more than one gateway. However, in various embodiments, the path will include only one courier. The forwarding path between gateway(s) and courier is determined based, at least in part, on the token that was originally transmitted from the device to the provider application.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A mobile device, comprising:
a processor to determine a courier for connecting to the mobile device, wherein the courier provisions a zone for the mobile device in response to connecting;

a memory to store a token, wherein the token is a combination of a unique identifier for the mobile device and a persistent zone identifier constantly associated with the zone;

a transmitter to transmit the token to a provider application; and a receiver to receive a push message comprising the persistent zone identifier from the provider application via a gateway, wherein the gateway routes the push message based at least in part on the persistent zone identifier.

2. The mobile device of claim 1, wherein the persistent zone identifier is assigned by the courier only during an initial courier connection.

3. The mobile device of claim 1, wherein the processor further comprises a connection module to randomly assign the courier for connecting to the mobile device.

4. The mobile device of claim 1, wherein the processor further comprises a connection module to assign the courier for connecting to the mobile device based on geographic location.

5. The mobile device of claim 1, wherein the processor further comprises an encryption module to encrypt the token.

6. A system, comprising:

a plurality of gateways, each gateway associated with a respective zone and each gateway to maintain presence information for mobile devices associated with the respective zone, wherein the presence information includes persistent zone identifiers constantly associated with the respective zone;

a plurality of couriers to provision the respective zone for the mobile devices and to back-propagate presence information for the mobile devices to respective gateways based at least on the persistent zone identifiers; and wherein the gateways and couriers are dynamically configured such that push messages can be automatically routed from a provider application to a mobile device via a gateway based at least in part on persistent zone identifiers included in the push messages.

7. The system of claim 6, wherein each gateway is dynamically associated with a respective zone.

8. The system of claim 6, wherein a courier can back-propagate presence information for mobile devices associated with different respective zones.

9. The system of claim 6, wherein each gateway comprises a forwarding module to determine whether to forward a push message received from the provider application to a courier having a connection to a destination mobile device or to route the push message to another gateway for forwarding to the courier having a connection to the destination mobile device.

10. The system of claim 9, wherein the forwarding module comprises a routing table for routing the push message to another gateway.

11. A method, comprising:

dynamically receiving, at a first gateway device, presence information for mobile devices from respective couriers connected to the mobile devices, wherein the presence information for each mobile device includes a token comprised of a unique device identifier and a persistent zone identifier constantly associated with a zone managed by the first gateway device, wherein the zone is provisioned for each mobile device by the respective courier connected to the mobile device;

receiving a push message at the first gateway device from a provider application, the push message including a mobile device token comprising a persistent zone identifier in the mobile device token;

routing the push message to a second gateway device if the persistent zone identifier in the mobile device token is not associated with the zone managed by the first gateway device; and forwarding the push message to a courier device currently connected to the mobile device associated with the mobile device token if the persistent zone identifier in the mobile device token is associated with the zone managed by the first gateway device.

12. The method of claim 11, wherein the push message, when forwarded to the courier device, is forwarded based on a mapping of unique device identifiers to courier devices, the mapping back-propagated by the courier device currently connected to the mobile device.

13. The method of claim 11, wherein receiving the message at the first gateway further comprises decrypting the mobile device token to determine the unique device identifier and the persistent zone identifier.

14. The method of claim 11, further comprising:

receiving updated presence information for the mobile device from a different courier, the updated presence information identifying the different courier as being connected to the mobile device;

receiving a subsequent push message at the first gateway device, the subsequent push message including the mobile device token; and forwarding the subsequent push message based on the mobile device token to the different courier device connected to the mobile device associated with the mobile device token if the fixed zone identifier in the mobile device token matches the zone currently associated with the first gateway device.

15. A method, comprising:

establishing a connection between a mobile device and a courier device;

provisioning a zone for the mobile device by the courier device in response to the connection;

storing a token, wherein the token is a combination of a unique identifier for the mobile device and a persistent zone identifier constantly associated with the zone;

transmitting the token to a provider application; and receiving a push message comprising the persistent zone identifier from the provider application via a gateway, wherein the gateway routes the push message based at least in part on the persistent zone identifier.

16. The method of claim 15, wherein storing the token comprises:

encrypting the token via an encryption algorithm; and storing the encrypted token.

17. A computer readable storage medium containing instructions, that when executed, cause a computer to:

dynamically receive, at a first gateway device, presence information for mobile devices from respective couriers connected to the mobile devices, wherein the presence information for each mobile device includes a token comprised of a unique device identifier and a persistent zone identifier constantly associated with a zone managed by the first gateway device, wherein the zone is provisioned for each mobile device by the respective courier connected to the mobile device;

receive a push message at the first gateway device from a provider application, the push message including a mobile device token comprising a persistent zone identifier in the mobile device token;

route the push message to a second gateway device if the persistent zone identifier in the mobile device token is not associated with the zone managed by the first gateway device; and forward the push message based on the mobile device token to a courier device connected to the mobile device associated with the mobile device token if the persistent zone identifier in the mobile device token is associated with the zone managed by the first gateway device.

18. The computer readable storage medium of claim 17, wherein the instructions that cause the push message to be forwarded to the courier device comprise further instructions that cause the message to be forwarded based on a mapping of unique device identifiers to courier devices, the mapping back-propagated by the courier device currently connected to the mobile device.

19. The computer readable storage medium of claim 17, wherein receiving the message at the first gateway further comprises decrypting the mobile device token to determine the unique device identifier and the persistent zone identifier.

20. The computer readable storage medium of claim 17, comprising further instructions that cause the machine to:

receive updated presence information for the mobile device from a different courier, the updated presence information identifying the different courier as being connected to the mobile device;

receive a subsequent push message at the first gateway device, the subsequent push message including the mobile device token; and forward the subsequent push message based on the mobile device token to the different courier device connected to the mobile device associated with the mobile device token if the fixed zone identifier in the mobile device token matches the zone currently associated with the first gateway device.

21. A computer readable storage medium containing instructions, that when executed, cause a computer to:

establish a connection between a mobile device and a courier device;

provision a zone for the mobile device from the courier device in response to the connection;

store a token, wherein the token is a combination of a unique identifier for the mobile device and a persistent zone identifier constantly associated with the zone;

transmit the token to a provider application; and receive a push message comprising the persistent zone identifier from the provider application via a gateway, wherein the gateway routes the push message based at least in part on the persistent zone identifier.

22. The computer readable storage medium of claim 21, wherein the instructions to store the token comprise further instructions that cause the computer to:

encrypt the token via an encryption algorithm; and store the encrypted token.

23. A system, comprising:

means for pushing messages from a provider application to mobile devices via any path through at least one gateway device and a single courier device, the means for pushing messages including:

means for dynamically partitioning the system into zones;

means for provisioning a zone for a mobile device by a courier device, the zone associated with a particular gateway device;

means for routing a push message comprising a persistent zone identifier constantly associated with the zone, received from a provider application, to the particular gateway device based on the persistent zone identifier;

means for forwarding the push message to a courier device known to be currently connected to the mobile device based at least in part on presence information back-propagated from the courier device to the particular gateway device; and means for forwarding the message from the courier device to the mobile device.

24. The system of claim 23, wherein the system is scalable to support hundreds of millions of mobile devices.

* * * * *